(12) United States Patent
Kubota et al.

(10) Patent No.: US 10,934,432 B2
(45) Date of Patent: Mar. 2, 2021

(54) CONDUCTIVE POLYAMIDE RESIN COMPOSITION

(71) Applicant: TOYOBO CO., LTD., Osaka (JP)

(72) Inventors: Shuji Kubota, Otsu (JP); Nobuhiro Yoshimura, Otsu (JP); Yuhei Fukumoto, Otsu (JP); Kazuki Iwamura, Otsu (JP); Kiyofumi Sakai, Kiyosu (JP); Osamu Mabuchi, Kiyosu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/483,845

(22) PCT Filed: Feb. 6, 2018

(86) PCT No.: PCT/JP2018/003926
§ 371 (c)(1),
(2) Date: Aug. 6, 2019

(87) PCT Pub. No.: WO2018/147250
PCT Pub. Date: Aug. 16, 2018

(65) Prior Publication Data
US 2020/0010678 A1    Jan. 9, 2020

(30) Foreign Application Priority Data

Feb. 7, 2017    (JP) .............................. JP2017-020190

(51) Int. Cl.
| | | |
|---|---|---|
| H01B 1/24 | (2006.01) | |
| C08L 77/00 | (2006.01) | |
| C08K 3/04 | (2006.01) | |
| C08L 23/06 | (2006.01) | |
| C08L 23/08 | (2006.01) | |
| C08L 23/26 | (2006.01) | |

(52) U.S. Cl.
CPC .............. C08L 77/00 (2013.01); C08K 3/04 (2013.01); C08L 23/06 (2013.01); C08L 23/0815 (2013.01); C08L 23/26 (2013.01); H01B 1/24 (2013.01); C08K 2201/001 (2013.01); C08L 2205/03 (2013.01); C08L 2207/062 (2013.01); C08L 2312/00 (2013.01)

(58) Field of Classification Search
CPC .... H01B 1/00; H01B 1/24; C09D 5/24; C08L 77/00
See application file for complete search history.

(56) References Cited

U.S. PATENT DOCUMENTS

| | | | |
|---|---|---|---|
| 6,197,858 B1 | 3/2001 | Hagano et al. | |
| 10,676,616 B2 * | 6/2020 | Yoshimura | C08K 3/16 |
| 2002/0037955 A1 | 3/2002 | Baumann et al. | |
| 2007/0205401 A1 * | 9/2007 | Terada | C08L 77/00 |
| | | | 252/511 |
| 2008/0073620 A1 * | 3/2008 | Taniguchi | C08L 2666/06 |
| | | | 252/511 |
| 2011/0027512 A1 | 2/2011 | Lee et al. | |
| 2018/0222314 A1 * | 8/2018 | Sakai | C09J 123/06 |

FOREIGN PATENT DOCUMENTS

| | | |
|---|---|---|
| JP | 50-157445 | 12/1975 |
| JP | 58-93756 | 6/1983 |
| JP | 60-124654 | 7/1985 |
| JP | 11-180171 | 7/1999 |
| JP | 2000-160004 | 6/2000 |
| JP | 2001-195919 | 7/2001 |
| JP | 2006-124659 | 5/2006 |
| JP | 2006-257429 | 9/2006 |
| WO | 2010/134682 | 11/2010 |

OTHER PUBLICATIONS

International Search Report dated Mar. 27, 2018 in International Application No. PCT/JP2018/003926.

* cited by examiner

*Primary Examiner* — Mark Kopec
(74) *Attorney, Agent, or Firm* — Wenderoth, Lind & Ponack, L.L.P.

(57) ABSTRACT

Disclosed is a conductive polyamide resin composition that excels not only in electroconductivity, but also in fuel resistance, particularly resistance against alcohol-containing fuel, and further excels in fluidity and moldability, and is capable of yielding a molded article with high impact resistance, the conductive polyamide resin composition including: 84 to 40% by mass of a polyamide resin (A); 5 to 30% by mass of conductive carbon black (B); 3 to 30% by mass of an ethylene-α-olefin copolymer (C) that has a reactive functional group capable of reacting with a terminal group of polyamide resin and/or an amido group on a principal chain of polyamide resin; and 1 to 20% by mass of a conductive polyethylene resin (D).

4 Claims, No Drawings

CONDUCTIVE POLYAMIDE RESIN COMPOSITION

TECHNICAL FIELD

The present invention relates to a conductive polyamide resin composition that contains a polyamide resin, conductive carbon black, and an olefinic resin. In more detail, the present invention relates to a conductive polyamide resin composition that excels not only in electroconductivity, but also in fuel resistance, particularly in resistance against alcohol-containing fuel, and is suitable for fuel tank cap and so forth.

BACKGROUND ART

Polyamide resin excels in chemical resistance against organic solvent such as gasoline, or alkali liquid, and also in fluidity, heat resistance and creep resistance, and is therefore employed as automotive exterior materials or internal components of engine room. The polyamide resin is also used for fuel supply system components among automotive components, after blended with carbon black or the like so as to impart electroconductivity, to suppress static electricity and electrification, and to make the resin possible to discharge electricity within a relatively short time.

Blending of carbon black with the polyamide resin, aiming at imparting electroconductivity to the polyamide resin, has been well known. Increase in the amount of addition of carbon black in pursuit of improved electroconductivity, however, induces various drawbacks to be solved, regarding moldability, fluidity and physical characteristics of the composition, all being associated with proposed countermeasures. For example, having been proposed are blending of carbon black and a modified ethylene copolymer to a polyamide resin aiming at improving fluidity and moldability (see Patent Literature 1); a method of blending a dispersion aid for carbon black, aimed at balancing between electroconductivity and impact resistance (see Patent Literature 2); and designation of a morphological structure of a composition, aimed at demonstration of electroconductivity, impact resistance and good sliding characteristic (see Patent Literature 3).

CITATION LIST

Patent Literature

PTL 1: Japanese Patent Laying-Open No. S58-93756
PTL 2: Japanese Patent Laying-Open No. H11-180171
PTL 3: Japanese Patent Laying-Open No. 2006-257429

SUMMARY OF INVENTION

Technical Problem

While each of the proposed methods has demonstrated an effect of improvement, it has become clear that the resin compositions with excellent impact resistance would gradually degrade their electroconductivity in an environment where they are brought into contact with fuel, particularly in an environment where they are brought into contact with alcohol-containing fuel.

The present invention is proposed in consideration of the aforementioned issues of the prior art, and is to provide a conductive polyamide resin composition in which a polyamide resin is blended with carbon black, which excels not only in electroconductivity, but also in fuel resistance, particularly resistance against alcohol-containing fuel, further excels in fluidity and moldability, capable of yielding a molded article with high impact resistance, and capable of providing a molded article such as fuel tank cap.

Solution to Problem

In pursuit of solving the aforementioned problems, the present inventors revealed after our thorough examinations that the drawbacks arose mainly from swelling of the ethylene-α-olefin copolymer, having been blended in order to create impact resistance and to disperse the conductive carbon black, due to the alcohol-containing fuel, and consequent expansion of inter-particle distance of the conductive carbon black enough to spoil the electroconductivity; and from fuel absorptivity of the conductive carbon black. The present inventors then found that the aforementioned object can be achieved by adding a conductive polyethylene resin to control a morphological structure, thus completed the present invention.

That is, the present invention is as follows.

[1] A conductive polyamide resin composition including:
84 to 40% by mass of a polyamide resin (A);
5 to 30% by mass of conductive carbon black (B);
3 to 30% by mass of an ethylene-α-olefin copolymer (C) that has a reactive functional group capable of reacting with a terminal group of polyamide resin and/or an amido group on a principal chain of polyamide resin; and
1 to 20% by mass of a conductive polyethylene resin (D),
the conductive polyamide resin composition satisfying characteristics (i) and (ii) below:
(i) a flat plate (100 mm×100 mm×2 mm (thickness)) obtained by injection molding of the conductive polyamide resin composition shows an initial volume resistivity less than or equal to $1 \times 10^5$ Ω·cm, and the flat plate after exposed to CM15 fuel for 168 hours shows a volume resistivity less than or equal to $1 \times 10^7$ Ω·cm; and
(ii) a test piece obtained by injection molding of the conductive polyamide resin composition shows a Charpy impact strength at −40° C. greater than or equal to 2.0 KJ/m².

[2] The conductive polyamide resin composition according to [1], wherein the conductive polyamide resin composition satisfies characteristic (iii) below:
(iii) showing a melt index, measured at 250° C. under 10 kgf load, greater than or equal to 2 g/10 min.

[3] The conductive polyamide resin composition according to [1] or [2], wherein polyethylene in the conductive polyethylene resin (D) is high density polyethylene.

Advantageous Effects of Invention

The conductive polyamide resin composition of the present invention can reduce decline of electroconductivity even in an environment where the composition is brought into contact with fuel containing alcohol such as methanol or ethanol, and may be used for automotive fuel system components such as cap or strainer for fuel tank, as well as filter, valve and so forth.

DESCRIPTION OF EMBODIMENTS

The present invention will be described below in detail. The conductive polyamide resin composition of the present invention includes:

84 to 40% by mass of a polyamide resin (A);

5 to 30% by mass of conductive carbon black (B);

3 to 30% by mass of an ethylene-α-olefin copolymer (C) that has a reactive functional group capable of reacting with a terminal group of polyamide resin and/or an amido group on a principal chain of polyamide resin; and 1 to 20% by mass of a conductive polyethylene resin (D), the conductive polyamide resin composition satisfying characteristics (i) and (ii) below:

(i) a flat plate (100 mm×100 mm×2 mm (thickness)) obtained by injection molding of the conductive polyamide resin composition shows an initial volume resistivity less than or equal to $1×10^5$ Ω·cm, and the flat plate after exposed to CM15 fuel for 168 hours shows a volume resistivity less than or equal to $1×10^7$ Ω·cm; and (ii) a test piece obtained by injection molding of the conductive polyamide resin composition shows a Charpy impact strength at −40° C. greater than or equal to 2.0 KJ/m$^2$.

Content of each ingredient is given by ratio (% by mass) in the conductive polyamide resin composition.

The characteristic (i) is achieved by controlling the later-described morphological structure of the conductive polyamide resin composition.

CM15 fuel is a product of Fuel-C (isooctane/toluene=1/1 (v/v)) containing 15% by mass of methanol.

The conductive polyamide resin composition of the present invention, in the form of a flat plate (100 mm×100 mm×2 mm (thickness)) obtained by injection molding, shows an initial volume resistivity less than or equal to $1×10^5$ Ω·cm. The initial volume resistivity is preferably less than or equal to $5×10^4$ Ω·cm. The lower limit of the initial volume resistivity is approximately $5×10^3$ Ω·cm as estimated typically from starting materials to be employed, although not specifically limited.

The conductive polyamide resin composition of the present invention can reduce decline of electroconductivity even in an environment where the composition is brought into contact with fuel, particularly alcohol-containing fuel, and can achieve a volume resistivity after exposure to CM15 fuel for 168 hours less than or equal to $1×10^7$ Ω·cm. The volume resistivity measured after exposure to CM15 fuel for 168 hours is preferably less than or equal to $1×10^6$ Ω·cm, and more preferably less than or equal to $5×10^5$ Ω·cm. The lower limit of the volume resistivity after exposure is approximately $5×10^4$ Ω·cm as estimated typically from the starting materials to be employed, although not specifically limited. The volume resistivity may be measured by a method described later in Examples.

The conductive polyamide resin composition excels in low temperature impact resistance, showing a Charpy impact strength at −40° C. greater than or equal to 2.0 KJ/m$^2$, achievable by constructing the composition as described later. The Charpy impact strength is preferably greater than or equal to 2.5 KJ/m$^2$. The upper limit of Charpy impact strength is approximately 20 KJ/m$^2$ as estimated typically from the starting materials to be employed, although not specifically limited. The Charpy impact strength may be measured by a method described later in Examples.

The conductive polyamide resin composition of the present invention is further preferably superior in fluidity, showing a melt index (ISO1133 method, 250° C., 10 kg load) greater than or equal to 2 g/10 min, which is more preferably greater than or equal to 3 g/10 min, and even more preferably greater than or equal to 5 g/10 min, and particularly greater than or equal to 10 g/10 min. The melt index may be fallen in an optimum range by controlling the contents of the individual ingredients described later. The upper limit of melt index is approximately 30 g/10 min as estimated typically from the starting materials to be employed, although not specifically limited. The melt index may be measured by a method described later in Examples.

The polyamide resin (A) used in the present invention has an acid amide bond (—CONN—) in the molecule. Specific examples include, but not limited to, polymer or copolymer obtained typically from ε-caprolactam, 6-aminocaproic acid, ω-enantholactam, 7-aminoheptanoic acid, 11-aminoundecanoic acid, 9-aminononanoic acid, α-pyrrolidone, and α-piperidine, or blends of them; and polymer or copolymer obtained by polycondensing a diamine such as hexamethylenediamine, nonamethylenediamine, undecamethylenediamine, dodecamethylenediamine or metaxylylenediamine, with a dicarboxylic acid such as terephthalic acid, isophthalic acid, adipic acid or sebacic acid, or blends of them. Polyamide 6 and polyamide 66 are preferable in view of availability.

Among the polyamide resins, those having a number average molecular weight of 7000 to 30000 are preferably used. With a number average molecular weight of smaller than 7000, toughness tends to decline, meanwhile exceeding 30000, the fluidity tends to decline. In terms of relative viscosity (measured in a 98% sulfuric acid solution), 1.5 to 4.0 is preferable. Content of the polyamide resin (A) is 84 to 40% by mass, and more preferably 70 to 50% by mass. With a content of polyamide resin less than 40% by mass, a molded article composed of the conductive polyamide resin composition will have a microstructure in which the morphological structure, desired to have a continuous phase of polyamide resin, is unfortunately destabilized.

As the conductive carbon black (B) used in the present invention, employable is ketjen black, acetylene black furnace black and channel black, without special limitation. Among them, ketjen black is particularly preferable since it can demonstrate high electroconductivity only with a small content. Content of the conductive carbon black (B) suitably falls in the range from 5 to 30% by mass, depending on a desired level of electroconductivity. The content of the conductive carbon black (B) is preferably 15 to 30% by mass, and more preferably 20 to 30% by mass.

Greater than or equal to 80% by mass of the content of these types of conductive carbon black is preferably dispersed in the polyamide resin that forms a continuous phase of the conductive polyamide resin composition. For such dispersion, very important is a kneading process, and also important is a functional group such as carboxy group or hydroxy group that resides on the surface of particles of carbon black. Thorough kneading in the kneading process can make carbon black more compatible with the polyamide resin through action of the functional group that resides on the surface of carbon black, and more dispersive into the continuous phase of polyamide resin. Although conditions for kneading and concentration of the functional group on the surface of carbon black are not specifically limited in the present invention, it is important that greater than or equal to 80% by mass of the content of carbon black is dispersed in the polyamide resin that composes the continuous phase, in the molded article of the conductive polyamide resin composition. With such dispersion of carbon black, obtainable is the composition that excels in electroconductivity represented by a volume resistivity of $1×10^5$ Ω·cm. Also other physical characteristics may be improved.

Polymer that composes a basic skeleton of the ethylene-α-olefin copolymer (C) (occasionally referred to as modified ethylene-α-olefin copolymer, or modified olefin copolymer, hereinafter) used in the present invention, having a functional group capable of reacting with the terminal group of polyamide resin and/or amido group on the principal chain of polyamide resin, is exemplified by, but not limited to, ethylene/propylene copolymer, ethylene/propylene/diene copolymer, ethylene/butene-1 copolymer, ethylene/octene-1 copolymer, ethylene/hexene-1 copolymer, ethylene/4-methylpentene-1 copolymer, and ethylene/cyclic olefin copolymer. Content of the modified ethylene-α-olefin copolymer (C) is 3 to 30% by mass. The content of modified ethylene-α-olefin copolymer (C) is preferably 3 to 20% by mass, more preferably 3 to 10% by mass, and even more preferably 3 to 8% by mass.

The functional group of the modified ethylene-α-olefin copolymer (C) used in the present invention, the functional group being capable of reacting with the terminal group of polyamide resin and/or amido group on the principal chain of polyamide resin, is a group capable of reacting with an amino group or a carboxy group which are the terminal groups of polyamide resin, or with the amido group of the principal chain of polyamide resin, and is specifically exemplified by carboxylic acid group, acid anhydride group, epoxy group, oxazoline group, amino group and isocyanate group. Among them, acid amido group is most reactive and preferable. As a matter of course, the larger the amount of functional group, the more the reaction with the polyamide resin can proceed, so that the ethylene-α-olefin copolymer can disperse with a finer grain size in the continuous phase of polyamide resin, and thereby the impact resistance of the composition will improve. Methods for manufacturing the ethylene-α-olefin copolymer having these functional groups include, but not limited to, a method by which a compound having any of the aforementioned functional groups is allowed to react in the process of manufacturing the copolymer; and a method by which copolymer pellets and a compound having such functional group are mixed, and then kneaded and allowed to react typically in an extruder.

The modified ethylene-α-olefin copolymer (C) used in the present invention preferably has a particle form with an average particle size less than or equal to 2 μm, and has the morphological structure dispersed in the polyamide resin that forms the continuous phase. The morphological structure is obtained in the process of manufacturing the composition, as a result of reaction between the polyamide resin and the modified ethylene-α-olefin copolymer. With the modified ethylene-α-olefin copolymer having an average particle size of less than or equal to 2 μm micro-dispersed in the polyamide resin, obtainable is an advanced impact characteristic.

The conductive polyethylene resin (D) used in the present invention is a polyethylene that contains the conductive carbon black in a preliminarily dispersed manner. The conductive polyethylene resin (D) preferably has a volume resistivity greater than or equal to 1 Ω·cm and less than or equal to 1×10 Ω·cm, and preferably contains 5 to 20% by mass of conductive carbon black.

Polyethylene that composes the conductive polyethylene resin (D) is obtainable by homopolymerization of ethylene, or copolymerization of ethylene with an α-olefin having 3 to 12 carbon atoms such as propylene, 1-butene, 1-pentene, 1-hexene, 4-methyl-1-pentene, 1-octene or the like. For modification purposes, also copolymerization with diene is acceptable. Diene compounds employable here are exemplified by butadiene, 1,4-hexadiene, ethylidene norbornene, dicyclopentadiene and so forth.

Ratio of content of comonomer used in polymerization is freely selectable. For an exemplary copolymerization of ethylene with α-olefin having 3 to 12 carbon atoms, the content of α-olefin in the ethylene-α-olefin copolymer is preferably 0 to 40 mol %, and more preferably 0 to 30 mol %.

As the polyethylene that composes the conductive polyethylene resin (D), preferable is high density polyethylene having a density greater than or equal to 0.96, in view of fuel resistance and slidability.

This sort of conductive polyethylene resin is commercially available, for example, from Lyondellbasell under the trade name of conductive polyethylene GM9350C.

The conductive carbon black that composes the conductive polyethylene resin (D) is exemplified by acetylene black, conductive furnace black, super-conductive furnace black, conductive channel black, and furnace black or channel black treated at high temperatures at around 1500° C., and is represented by ketjen black, which is a kind of furnace black. Among them, preferable is ketjen black having a hollow shell structure whose primary particle is hollow inside.

Content of the conductive polyethylene resin (D) is 1 to 20% by mass, more preferably 2 to 10% mass, and even more preferably 3 to 8% by mass. If the content of conductive polyethylene resin (D) is less than 1% by mass, the fuel resistance would be improved only to a small degree, meanwhile if exceeding 20% by mass, the impact resistance would decline. In the composition of the present invention, the modified ethylene-α-olefin copolymer dispersed in the polyamide resin, and polyethylene that composes the conductive polyethylene resin are well dispersed in the composition, since they belong to the same category of olefinic resin and are highly compatible, so that the conductive carbon black can efficiently demonstrate electroconductivity.

The conductive polyamide resin composition of the present invention places great importance on its morphological structure. Since the polyamide resin (A) composes the continuous phase as a matrix, so that the modified ethylene-α-olefin copolymer (C) that is micro-dispersed therein as a result of reaction with the polyamide resin can have an average size of dispersed particle of less than or equal to 2 μm. Moreover, greater than or equal to 80% by mass of the content of the conductive carbon black (B) is dispersed in the polyamide resin (A) that forms the continuous phase, with the aid of the functional group that resides on the surface of the particle and of kneading conditions. Also the conductive polyethylene resin (D) is uniformly dispersed while embracing the conductive carbon black, by virtue of affinity with the micro-dispersed modified ethylene-α-olefin copolymer (C). Hence, the conductive carbon black in the polyethylene can come close to the conductive carbon black (B) in the polyamide resin. This contributes to assist the composition to demonstrate electroconductivity. In addition, since the conductive carbon black becomes less fuel-absorptive with the aid of polyethylene that is less likely to swell with fuel or alcohol-containing fuel, so that the electroconductivity may be suppressed from declining due to fuel or alcohol-containing fuel.

For control towards the aforementioned morphological structure, a method of blending the individual ingredients is an important issue. It is effective to obtain the conductive polyamide resin composition, by preliminarily allowing the conductive carbon black (B) to disperse into the polyamide resin (A), and then by blending the ethylene-α-olefin copolymer (C) that has a reactive functional group capable of reacting with the polyamide resin, as well as the conductive polyethylene resin (D).

Besides the aforementioned ingredients (A), (B), (C) and (D), the conductive polyamide resin composition of the present invention may contain copper oxide and/or alkali metal halide which are weatherability improver used for common polyamide resin compositions; phenolic antioxidant or phosphorus-containing antioxidant as light or heat stabilizer; mold releasing agent; nucleating agent; lubricant; pigment; dye and so forth.

The conductive polyamide resin composition of the present invention is preferable when the ingredients (A), (B), (C) and (D) account for more than or equal to 80% by mass in total, more preferably more than or equal to 90% by mass, and even more preferably more than or equal to 95% by mass.

Since the conductive polyamide resin composition of the present invention cannot form a stable morphological structure simply by mixing the individual ingredients and by kneading them in an extruder, so that kneading by a special method is recommendable. For example, the polyamide resin (A) and the conductive carbon black (B) are melt kneaded in a melt kneader (twin screw extruder, melt reactor, etc.), so as to uniformly disperse the carbon black into the polyamide resin, and then the modified ethylene-α-olefin copolymer (C) and the conductive polyethylene resin (D), and other optional additive(s) are added, followed by further melt kneading. By employing such two-stage melt kneading, it becomes possible to stably manufacture the polyamide conductive resin composition having the morphological structure according to the present invention. The manufacture of the polyamide conductive resin composition of the present invention does not, however, rely only upon such specific methods of blending and melt kneading, but also upon any other methods of blending and melting, so long as the aforementioned composition and morphological structure are obtainable.

EXAMPLES

The present invention will further be detailed below referring to Examples. The present invention is, however, not limited to these Examples.

The individual characteristics and physical properties were measured by test methods described below. Test piece was molded using an injection molding machine (IS80, from Toshiba Machine Co., Ltd.) under conditions below.
Resin temperature: 275° C.
Die temperature: 40° C.
Injection pressure: 50 kg/cm$^2$
Injection time: 1 second
Retention pressure: 60 kg/cm$^2$
Retention time: 6 seconds 1. Volume Resistivity An injection-molded 100 mm×100 mm×2 mm (thick) plate was measured regarding volume resistivity using a digital multimeter (TR-6843, from Advantest Corporation), with terminals connected to both ends in the direction normal to position of a gate. The test piece was measured after dried in vacuo at 70° C. for 12 hours, and seasoned in an environment of 20° C., 50% RH for 24 hours.

2. Volume Resistivity (after Exposed to Fuel)

CM15 fuel in which a test piece is immersed was prepared by mixing Fuel-C (isooctane/toluene=1/1 (v/v)), with methanol (from Nacalai Tesque, Inc., 99.5% purity) with the content adjusted to 15% by mass. The test was conducted by immersing the test piece used in 1. into the fuel, and then by allowing the test piece to stand still in an oven at 60° C.

The test piece was taken out from the CM15 fuel after immersion for 168 hours, wiped to remove the solution adhered on the surface, and then subjected within one minute to measurement of volume resistivity in the same way as in 1.

3. Notched Charpy Impact Strength

Low temperature Charpy impact strength: In compliance with ISO-179-1eA, a dumbbell piece was manufactured by injection molding, and measured at −40° C.

4. Melt Index

Measured in compliance with ISO 1133. Measured at 250° C. under 10 kgf load.

5. Observation of Morphological Structure

A frozen section was manufactured from the center part of the 100 mm×100 mm×2 mm (thick) plate obtained by injection molding.

For measurement of average particle size of the modified ethylene-α-olefin copolymer (C), a frozen section of a sample, having a cross section taken perpendicularly to the direction of resin flow, was manufactured, dyed in a 5% aqueous phosphotungstic acid solution for 30 minutes, subjected to vacuum deposition of carbon, and then observed and photographed under a transmission electron microscope JEM2010 from JEOL, at an acceleration voltage of 200 kV, and at 5000× direct magnification. Next, the thus obtained photograph was analyzed using an image analyzer, to determine the average particle size. When an image of a domain (dispersed phase) observed under the image analyzer appears to have an elliptic form, conversion was made to determine a sphere-equivalent diameter as the particle size. In the conversion, an average of long diameter and short diameter of the elliptic form was determined as the diameter of sphere.

As for location of the conductive carbon black (B), the number of all carbon black particles observed in the obtained photograph, and the number of carbon black particles observed in the continuous phase are counted using the image analyzer, and percentage of the number of conductive carbon black (B) particles observed in the continuous phase was determined in percent by mass. Note that the carbon black in the conductive polyethylene resin (D) was found to reside in a dispersion phase, but not in the dispersion phase of the modified ethylene-α-olefin copolymer (C), being discriminable from the conductive carbon black (B), and was therefore not counted as the carbon black observed in the photograph.

Staring materials of the compositions used in Examples and Comparative Examples are as follows.
Polyamide Resin (A)
A-1: Toyobo nylon T-840 (from Toyobo Co., Ltd., polyamide 6, relative viscosity=2.2)
Conductive Carbon Black (B)
B-1: Furnace carbon 100 (from Lion Corporation)
B-2: Ketjen carbon EC (from Lion Corporation)
Modified Ethylene-α-Olefin Copolymer (C)
C-1: Modified olefin copolymer TAFMER (registered trademark) MH7020 (maleic anhydride-modified ethylene-α-olefin copolymer, from Mitsui Chemical, Inc.)
Conductive Polyethylene Resin (D)
D-1: Conductive polyethylene GM9350C (from Lyondellbasell, high density polyethylene with 10% by mass of carbon black dispersed therein)

D-2: Conductive polyethylene with 20% by mass carbon, developed product (from Lyondellbasell, high density polyethylene with 20% by mass of carbon black dispersed therein)

D': High density polyethylene MME001 (from Mitsui Chemicals, Inc.)

Examples and Comparative Examples

Before compounding of the whole materials, first, the polyamide resin and the conductive carbon black were melt kneaded according to mass ratio listed in Table 1, in a twin screw extruder (PCM30, from Ikegai Corporation), to prepare a masterbatch pellet. Next, using the thus obtained masterbatch pellet, the individual ingredients were weighed and blended according to the compositional ratio listed in Table 1, and melt kneaded in the twin screw extruder (PCM30, from Ikegai Corporation) with the cylinder temperature preset at 260° C., to prepare a pellet of the conductive polyamide resin composition. The obtained conductive polyamide resin composition was used for individual evaluations. Results are summarized in Table 1.

TABLE 1

|  |  | Examples |  |  |  | Comparative Example |  |  |
|---|---|---|---|---|---|---|---|---|
|  |  | 1 | 2 | 3 | 4 | 1 | 2 | 3 |
| Resin composition % by mass | A-1 Polyamide 6 | 56 | 56 | 63 | 63 | 56 | 56 | 56 |
|  | B-1 Furnace carbon |  | 24 |  |  |  |  |  |
|  | B-2 Ketjen carbon | 24 |  | 27 | 27 | 24 | 24 | 27 |
|  | C-1 Modified olefin copolymer | 5 | 5 | 5 | 5 | 20 | 15 | 5 |
|  | D-1 Conductive polyethylene 1 | 15 | 15 | 5 |  |  |  |  |
|  | D-2 Conductive polyethylene 2 |  |  |  | 5 |  |  |  |
|  | D' High Density Polyethylene |  |  |  |  |  | 5 | 12 |
| Morphological Structure | Dispersion of Conductive Carbon Black (% by mass in polyamide resin) | 100 | 100 | 100 | 100 | 100 | 100 | 100 |
|  | Diameter of modified olefin copolymer (µm) | 0.5 | 0.5 | 0.5 | 0.5 | 0.3 | 0.2 | 0.5 |
| Characteristics | Volume specific resistivity ($\Omega \cdot cm$) Initial | $1 \times 10^4$ | $1 \times 10^4$ | $5 \times 10^4$ | $5 \times 10^4$ | $5 \times 10^4$ | $5 \times 10^4$ | $5 \times 10^4$ |
|  | After exposed to fuel | $1 \times 10^5$ | $1 \times 10^5$ | $5 \times 10^5$ | $5 \times 10^5$ | $5 \times 10^8$ | $5 \times 10^7$ | $3 \times 10^7$ |
|  | Charpy impact strength (KJ/m$^2$) | 5 | 5 | 3.5 | 3.5 | 15 | 10 | 7 |
|  | Melt index (g/10 min) | 3 | 3 | 25 | 15 | 10 | 8 | 10 |

The conductive polyamide resin compositions of Comparative Examples 1, 2 and 3 were confirmed to show volume resistivity exceeding $1 \times 10^7$ $\Omega \cdot cm$, after immersed in the CM15 fuel for 168 hours.

INDUSTRIAL APPLICABILITY

According to the present invention, the resin composition is applicable to members of automobiles using bioethanol, and to components for electric/electronic products.

The invention claimed is:

1. A conductive polyamide resin composition comprising:
    84 to 40% by mass of a polyamide resin (A);
    5 to 30% by mass of conductive carbon black (B);
    3 to 30% by mass of an ethylene-α-olefin copolymer (C) that has a reactive functional group capable of reacting with a terminal group of polyamide resin and/or an amido group on a principal chain of polyamide resin; and
    1 to 20% by mass of a conductive polyethylene resin (D), wherein
    the conductive polyethylene resin (D) contains 5 to 20% by mass of a dispersed conductive carbon black which is discriminable from the conductive carbon black (B),
    greater than or equal to 80% by mass of the content of the conductive carbon black (B) is dispersed in the polyamide resin (A) that forms a continuous phase,
    the carbon black dispersed in the conductive polyethylene resin (D) resides in a dispersion phase, but not in the dispersion phase of the ethylene-α-olefin copolymer (C), and
    the conductive polyamide resin composition satisfying characteristics (i) and (ii) below:
    (i) a flat plate (100 mm×100 mm×2 mm (thickness)) obtained by injection molding of the conductive polyamide resin composition shows an initial volume resistivity less than or equal to $1 \times 10^5$ $\Omega \cdot cm$, and the flat plate after exposed to CM15 fuel for 168 hours shows a volume resistivity less than or equal to $1 \times 10^7$ $\Omega \cdot cm$; and
    (ii) a test piece obtained by injection molding of the conductive polyamide resin composition shows a Charpy impact strength at −40° C. greater than or equal to 2.0 KJ/m$^2$.

2. The conductive polyamide resin composition according to claim 1, wherein the conductive polyamide resin composition satisfies characteristic (iii) below:
    (iii) showing a melt index, measured at 250° C. under 10 kgf load, greater than or equal to 2 g/10 min.

3. The conductive polyamide resin composition according to claim 2, wherein polyethylene in the conductive polyethylene resin (D) is high density polyethylene.

4. The conductive polyamide resin composition according to claim 1, wherein polyethylene in the conductive polyethylene resin (D) is high density polyethylene.

* * * * *